United States Patent
Kakuda et al.

[11] Patent Number: 6,144,305
[45] Date of Patent: Nov. 7, 2000

[54] ELECTRONIC APPARATUS

[75] Inventors: Noriyasu Kakuda; Kousei Kazeto, both of Kyoto; Satoshi Oshita, Tokyo, all of Japan

[73] Assignee: Kabushiki Kaisha Bandai, Tokyo, Japan

[21] Appl. No.: 09/342,576

[22] Filed: Jul. 8, 1999

[30] Foreign Application Priority Data

Jul. 10, 1998 [JP] Japan .................................. 10-196399

[51] Int. Cl.⁷ .................................................. G08B 21/00
[52] U.S. Cl. ........................ 340/651; 340/653; 340/687; 361/68
[58] Field of Search .................................... 340/649, 650, 340/651, 652, 653, 660, 664, 686.1, 687; 361/68, 93, 728

[56] References Cited

U.S. PATENT DOCUMENTS

| | | | |
|---|---|---|---|
| 5,179,343 | 1/1993 | Chishima et al. | 324/538 |
| 5,179,494 | 1/1993 | Matsubara | 361/91 |
| 5,341,282 | 8/1994 | Brambilla et al. | 363/50 |
| 5,406,260 | 4/1995 | Cummings et al. | 340/568 |
| 5,600,300 | 2/1997 | Povilaitis | 340/438 |
| 5,786,769 | 7/1998 | Coteus et al. | 340/687 |

*Primary Examiner*—Edward Lefkowitz
*Attorney, Agent, or Firm*—Baker & McKenzie

[57] ABSTRACT

An electronic apparatus is provided that can eliminate unlawful cartridges while preventing a malfunction by checking whether there is a short-circuit of pin terminals at the time of turning on the power source and conducting further improved security checks. The electronic apparatus has an electronic apparatus body 2 and a cartridge 5 to be detachably mounted to the electronic apparatus body 2. The cartridge 5 is equipped with a connector having a plurality of terminals and is connected to the electronic apparatus body 2 via the connector. The electronic apparatus body 2 outputs a first and a second short-circuit detecting signal for conducting a short-circuit detection of a circuit portion connected via the plurality of terminals. The cartridge 5 receives the first short-circuit detecting signal and the second short-circuit detecting signal via the plurality of terminals and determines whether the circuit portion is short-circuited or not based on the received first and second short-circuit detecting signals.

20 Claims, 7 Drawing Sheets

(A) CLOCK SIGNAL
(B) RESET SIGNAL
(C) SIGNALS X7 THROUGH X4
(D) SIGNALS X3 THROUGH X0
(E) OK SIGNAL

FIG. 8

ELECTRONIC APPARATUS

BACKGROUND OF THE INVENTION

1. Field of the Invention

This invention relates to an electronic apparatus in which a cartridge is detachably mounted to a body of an electronic apparatus, and a game program to be executed is read out from a memory incorporated in the cartridge.

2. Description of the Prior Art

There have been proposed various kinds of electronic apparatuses in which a cartridge is detachably mounted to the body of the electronic apparatus, and a game program to be executed is read out from a memory incorporated in the cartridge. The conventional cartridges mounted to the electronic apparatuses of this kind have a connector for connection, which is provided with a plurality of pin terminals. A circuit portion of the electronic apparatus body and a memory circuit portion of the cartridge are electrically connected through the pin terminals.

With the technological advances in electronic apparatuses provided in recent years, a multiplicity of pin terminals are provided in order to exchange multiple kinds of data and various kinds of signals between the electronic apparatus body and the cartridge. When the multiplicity of pin terminals are arranged in a limited space of a connector, it is necessary to set a narrow width for each pin terminal and to set intervals between adjacent pin terminals as narrow as possible.

Furthermore, the conventional electronic apparatuses determine whether or not a cartridge is lawful (legal) or unlawful (illegal) when the cartridge is mounted thereinto. Then, if it is an unlawful one, the execution of the game program is prohibited.

For example, first image data such as a trademark is stored in a memory provided on the body side of the electronic apparatus, and second image data is stored in a memory provided on the cartridge side. In the case where the first and second image data coincide with each other, the game program is permitted to execute.

However, in the case where the multiplicity of pin terminals are arranged in a limited space of the connector, a narrow width of each pin terminal is set and intervals between the adjacent pin terminals are also set as narrow as possible, it is presumed that the pin terminals may contact with other pin terminals or a circuit portion due to a slight shift upon mounting the cartridge. When the pin terminals contact other pin terminals or a circuit portion in this way, there is a fear that a signal will not be properly transmitted or will be converted into another signal to cause a malfunction.

Furthermore, in the conventional electronic apparatuses, if the mounted cartridge is unlawful, the content of the cartridge is eliminated. However, unlawful cartridges are still found on the market. Due to this fact, it has been desired to ensure that unlawful cartridges are entirely eliminated from the market by conducting further improved security checks.

SUMMARY OF THE INVENTION

The present invention is devised in view of the above drawbacks. It is an object of the present invention to provide an electronic apparatus which can detect a short-circuit of a plurality of pin terminals and a circuit portion connected to these pin terminals in order to prevent a malfunction from occurring.

Furthermore, it is another object of the present invention to provide an electronic apparatus that automatically checks for a short-circuit of pin terminals at the time of turning on the power source and eliminates unlawful cartridges while ensuring to prevent a malfunction by conducting further improved security checks.

In order to attain the above objects and other objects and advantages, an electronic apparatus according to a first embodiment of the present invention has the following characteristics:

(a) the electronic apparatus has an electronic apparatus body and a cartridge to be detachably mounted to the electronic apparatus body;

(b) the cartridge is equipped with a connector having a plurality of terminals and is connected to the electronic apparatus body via the connector;

(c) the electronic apparatus body has a first signal outputting means for outputting a first short-circuit detecting signal for conducting a short-circuit detection of a circuit portion to be connected via the plurality of terminals;

(d) the electronic apparatus body has a second signal outputting means for outputting a second short-circuit detecting signal after outputting the first short-circuit detecting signal;

(e) the first short-circuit detecting signal consists of a plurality of bits and each bit is transmitted via each terminal of the connector;

(f) each bit forming the first short-circuit detecting signal is set at such a logical level that bits passing through adjacent terminals have different logical levels;

(g) the second short-circuit detecting signal consists of a plurality of bits and each bit is transmitted via each terminal of the connector;

(h) each bit forming the second short-circuit detecting signal is set at such a logical level that bits passing through adjacent terminals have different logical levels and is set at a logical level different from a logical level of each corresponding bit of the first short-circuit detecting signal;

(i) the cartridge has receiving means for receiving the first short-circuit detecting signal and the second short-circuit detecting signal via the plurality of terminals;

(j) the receiving means has determining means for determining whether or not the circuit portion is short-circuited based on the received first and second short-circuit detecting signals; and (k) the determining means determines that short-circuit detection results show no short-circuit when logical levels of adjacent bits of the first short-circuit detecting signal are different from each other, logical levels of adjacent bits of the second short-circuit detecting signal are different from each other, and each bit forming the second short-circuit detecting signal has a logical level different from a logical level of each corresponding bit of the first short-circuit detecting signal.

An electronic apparatus according to a second embodiment of the present invention has the following characteristics in addition to those of first embodiment:

(a) the cartridge has program storing means for storing a game program and first code data storing means for storing first code data for security checks;

(b) the cartridge has reading means for reading the first code data from the first code data storing means when the determining means determines that short-circuit detection results show no short-circuit;

(c) the cartridge has code data outputting means for outputting the read first code data to the electronic apparatus body via the connector;

(d) the electronic apparatus body has second code data storing means for storing second code data for security checks;

(e) the electronic apparatus body has comparing and determining means for comparing the first code data and the second code data to determine whether or not the data have a predetermined relationship;

(f) the electronic apparatus body has prohibiting means for prohibiting a transfer of a game program from the cartridge to the electronic apparatus body when the comparing and determining means determines that the first code data and the second code data do not have the predetermined relationship;

(g) the electronic apparatus body has permitting means for permitting a transfer of a game program from the cartridge to the electronic apparatus body when the comparing and determining means determines that the first code data and the second code data have the predetermined relationship; and (h) the electronic apparatus body has control processing means for executing control processing for a game based on the game program transferred from the cartridge.

DETAILED DESCRIPTION OF THE INVENTION

Figure 1:
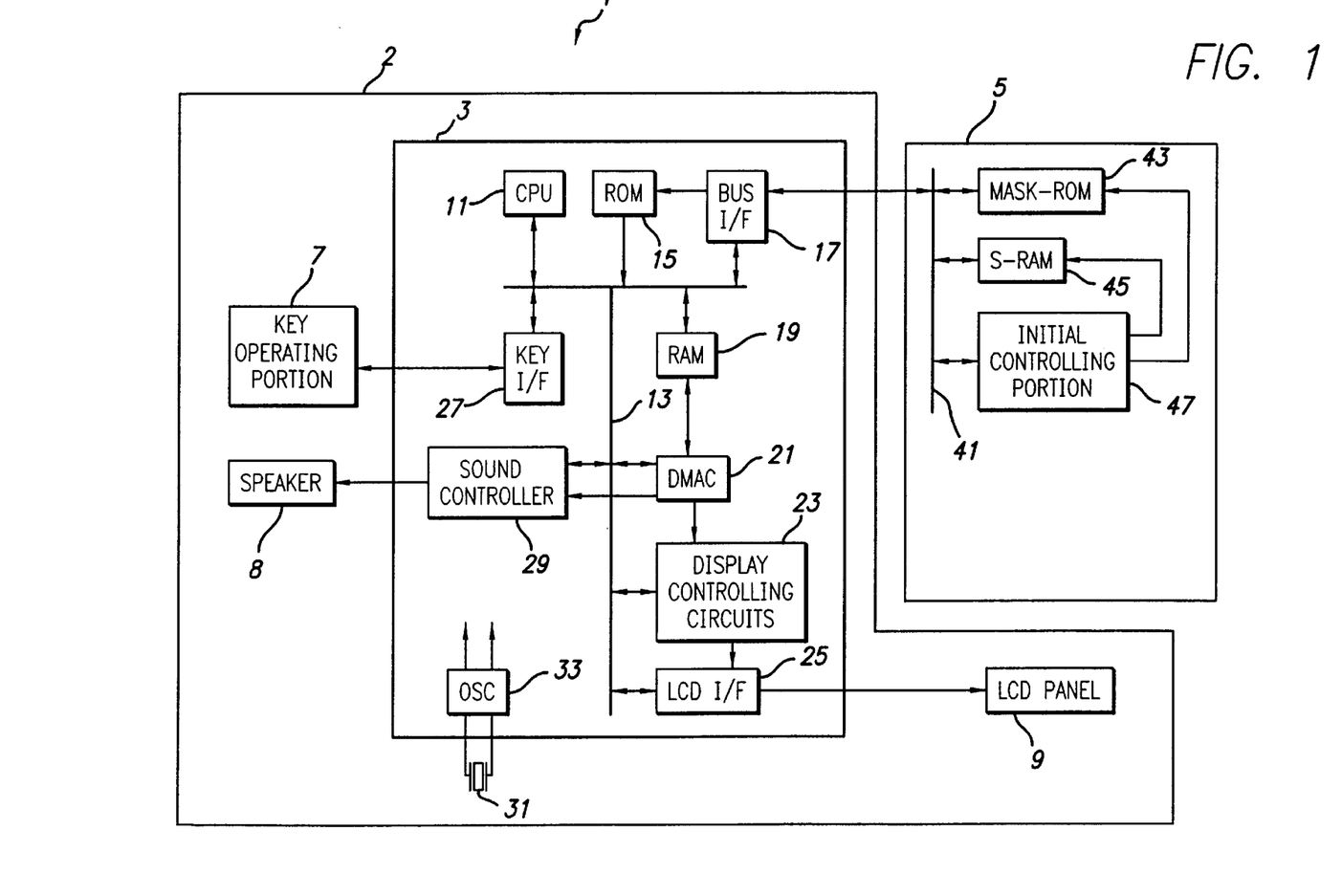
FIG. 1 is a block diagram showing a circuit portion of an electronic apparatus in accordance with an embodiment of the present invention.
Figure 2:
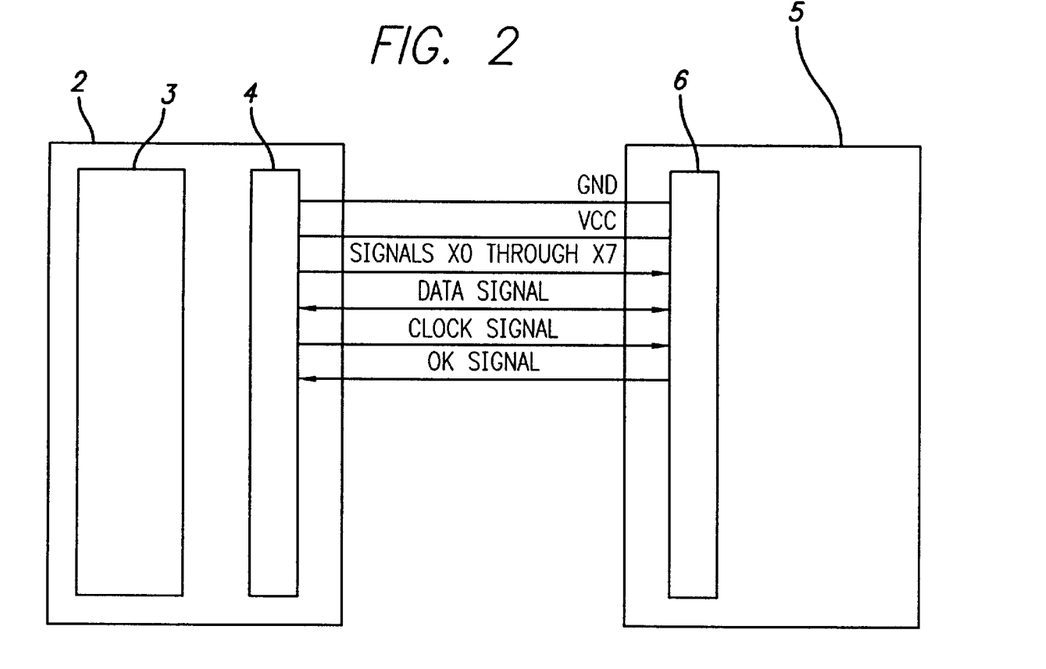
FIG. 2 is a block diagram that shows the exchange of signals between an electronic apparatus body and a cartridge in accordance with an embodiment of the present invention.
Figure 3:
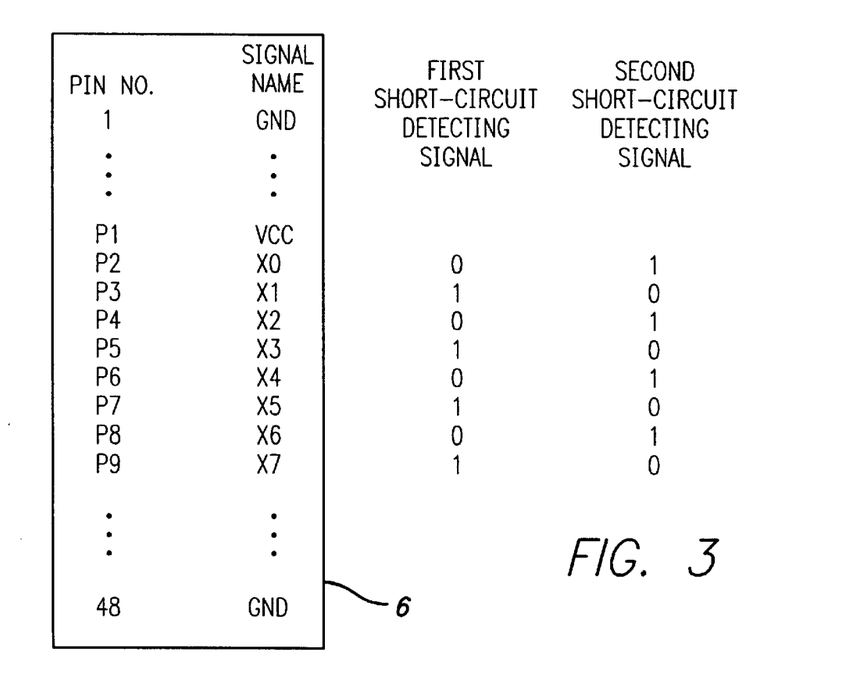
FIG. 3 is a table explaining an arrangement of pin terminals of a connector and short-circuit detecting signals transmitted via the respective pin terminals in accordance in accordance with an embodiment of the present invention.

An electronic apparatus in accordance with an embodiment of the present invention is now described with reference to the drawings. As shown in FIGS. 1 through 3, an electronic apparatus 1 in accordance with an embodiment of the present invention has an electronic apparatus body 2 and a cartridge 5 to be detachably mounted to the electronic apparatus body 2. The cartridge 5 is equipped with a connector 6 having a plurality of terminals (pin terminals) and is connected to the electronic apparatus body 2 via the connector 6. Similarly, the electronic apparatus body 2 is equipped with a connector 4 having a plurality of terminals (pin terminals) and is connected to the cartridge 5 via the connector 4. That is to say, when the cartridge 5 is mounted to the electronic apparatus body 2, respective corresponding pin terminals of the connector 4 and the connector 6 are connected and the electronic apparatus body 2 and the cartridge 5 are electrically connected via these terminals.

The electronic apparatus body 2 has a system large scale integrated circuit (LSI) 3 and a key operating portion 7, a speaker 8 and liquid crystal display (LCD) panel 9, which are connected to the system LSI 3. The key operating portion 7 has a plurality of key switches (not shown) such as a direction key, a selection key, and a determination key. The speaker 8 outputs various kinds of voices, effective sounds, etc., relating to a game. The LCD panel 9 displays an initial screen at the time of turning on a power source (not shown) and various kinds of characters and background images depending on developments of a game.

As shown in FIG. 1, the system LSI 3 has a central processing unit (CPU) 11, a read-only memory (ROM) 15, a bus interface (I/F) circuit 17, a random access memory (RAM) 19, a DMA controller (DMAC) 21, a display controlling circuit 23, a LCD I/F circuit 25, a key I/F circuit 27, and a sound controller 29. These various kinds of circuit portions are connected with each other via an internal bus 13. The system LSI 3 is provided with an oscillating circuit (OSC) 33.

Various programs such as an initialization program for conducting initialization when the power source is turned on and executing short-circuit checks and security checks, control data of various games, etc. are stored in the ROM 15. The CPU 11 executes overall control processing based on the various kinds of programs and the control data stored in the ROM 15.

The bus I/F circuit 17 is connected to each circuit portion of the system LSI 3 and is an interface for exchanging data and various kinds of signals with the cartridge 5. Furthermore, the bus I/F circuit 17 has a storing portion for storing a first short-circuit detecting signal and a second short-circuit detecting signal, for conducting short-circuit detection, and outputs the first and the second short-circuit detecting signals at the time of turning on the power source. That is to say, the bus I/F circuit 17 has first signal outputting means for outputting the first short-circuit detecting signal for conducting short-circuit detection of a circuit portion to be connected via each terminal of the connectors 4 and 6, and has second signal outputting means for outputting the second short-circuit detecting signal after outputting the first short-circuit detecting signal.

The RAM 19 is for temporarily storing various kinds of data such as display data and sound data. The DMAC 21 is connected to the RAM 19 and transfers various kinds of data such as display data and sound data stored in the RAM 19 directly to the display controlling circuit 23 and the sound controller 29 without undergoing the control of the CPU 11. The display controlling circuit 23 conducts control functions for processing various kinds of data such as coordinate data, font data and image data transferred from the DMAC 21 into data for displaying. The LCD I/F circuit 25 is connected to the display controlling circuit 23 and outputs display data inputted from the display controlling circuit 23 to the LCD panel 9. The sound controller 29 converts various kinds of data such as sound data transferred from the DMAC 21 into voice signals and outputs them to the speaker 8.

The key I/F circuit 27 is connected to the key operating portion 7 and outputs operating signals to the CPU 11 when a key switch of the key operating portion 7 is pressed.

The oscillating circuit 33 is connected to an oscillator 31 and divides an oscillating pulse of a certain period from the oscillator 31 to generate a plurality of kinds of clock pulses with different cycles. The system LSI 3 has a time-information output portion (not shown) for outputting time information based on a clock pulse of a certain cycle from the oscillator 33.

As shown in FIG. 2, the system LSI 3 and the cartridge 5 are connected via the connectors 4 and 6. A ground (GND) and an electrical power source (VCC) are supplied from the system LSI 3 to the cartridge 5 and various kinds of data are exchanged through the connectors 4 and 6. Furthermore, signals X0 through X7 and clock signals are transmitted from the system LSI 3 to the cartridge 5 and an OK signal is transmitted from the cartridge 5 to the system LSI 3.

As shown in FIG. 3, the first short-circuit detecting signal for conducting short-circuit detection consists of a plurality of bits and each bit is transmitted in parallel via each pin terminal of the connector 6. Each bit forming the first short-circuit detecting signal is set at such a logical level that bits passing through adjacent pin terminals have different logical levels. That is to say, a signal X0 transmitted via a pin terminal P2 of the connector 6 is set at a logical level "0", a signal X1 transmitted via a pin terminal P3 is set at a logical level "1", a signal X2 transmitted via a pin terminal P4 is set at a logical level "0", a signal X3 transmitted via a pin terminal P5 is set at a logical level "1", a signal X4 transmitted via a pin terminal P6 is set at a logical level "0", a signal X5 transmitted via a pin terminal P7 is set at a logical level "1", a signal X6 transmitted via a pin terminal P8 is set at a logical level "0", and a signal X7 transmitted via a pin terminal P9 is set at a logical level "1". Furthermore, although the first short-circuit detecting signal is described above as transmitted via each of the eight pin terminals P2 through P9 which are disposed sequentially, the present invention is not limited to this description and, for example, the first short-circuit detecting signal may be such a structure as the first short-circuit detecting signal is transmitted via more or less than eight pin terminals which are disposed sequentially.

The second short-circuit detecting signal, transmitted after the first short-circuit detecting signal is outputted, consists of a plurality of bits and each bit is transmitted in parallel via each pin terminal of the connector 6. Each bit forming the second short-circuit detecting signal is set at such a logical level that bits passing through adjacent terminals have a different logical level and is also set at a logical level different from a logical level of each corresponding bit of the first short-circuit detecting signal. That is to say, a signal X0 transmitted via a pin terminal P2 of the connector 6 is set at a logical level "1", a signal X1 transmitted via a pin terminal P3 is set at a logical level "0", a signal X2 transmitted via a pin terminal P4 is set at a logical level "1", a signal X3 transmitted via a pin terminal P5 is set at a logical level "0", a signal X4 transmitted via a pin terminal P6 is set at a logical level "1", a signal X5 transmitted via a pin terminal P7 is set at a logical level "0", a signal X6 transmitted via a pin terminal P8 is set at a logical level "1," and a signal X7 transmitted via a pin terminal P9 is set at a logical level "0". Furthermore, although the second short-circuit detecting signal is described above as transmitted via each of the eight pin terminals P2 through P9 which are disposed sequentially, the present invention is not limited to this description and, for example, the second short-circuit detecting signal may be such a structure as the first short-circuit detecting signal is transmitted via more than eight or less than eight pin terminals which are disposed sequentially.

Referring again to FIG. 1, the cartridge 5 has a MASK-ROM 43, a S-RAM 45, and an initial controlling portion 47, whose circuit portions are mutually connected via a bus 41. A game program is stored in the MASK-ROM 43 and a game progresses in accordance with the game program. The S-RAM 45 has a backup battery and functions as a non-volatile memory. Various kinds of game information such as data at the end of a game are stored in the S-RAM 45. A player can restart a game from the point he stopped the game previously by referring to game information stored in the S-RAM 45 when the power source is turned on prior to resuming the game. Furthermore, the present invention is not limited to the S-RAM 45 but may use suitable kinds of other nonvolatile memories.

Figure 4:
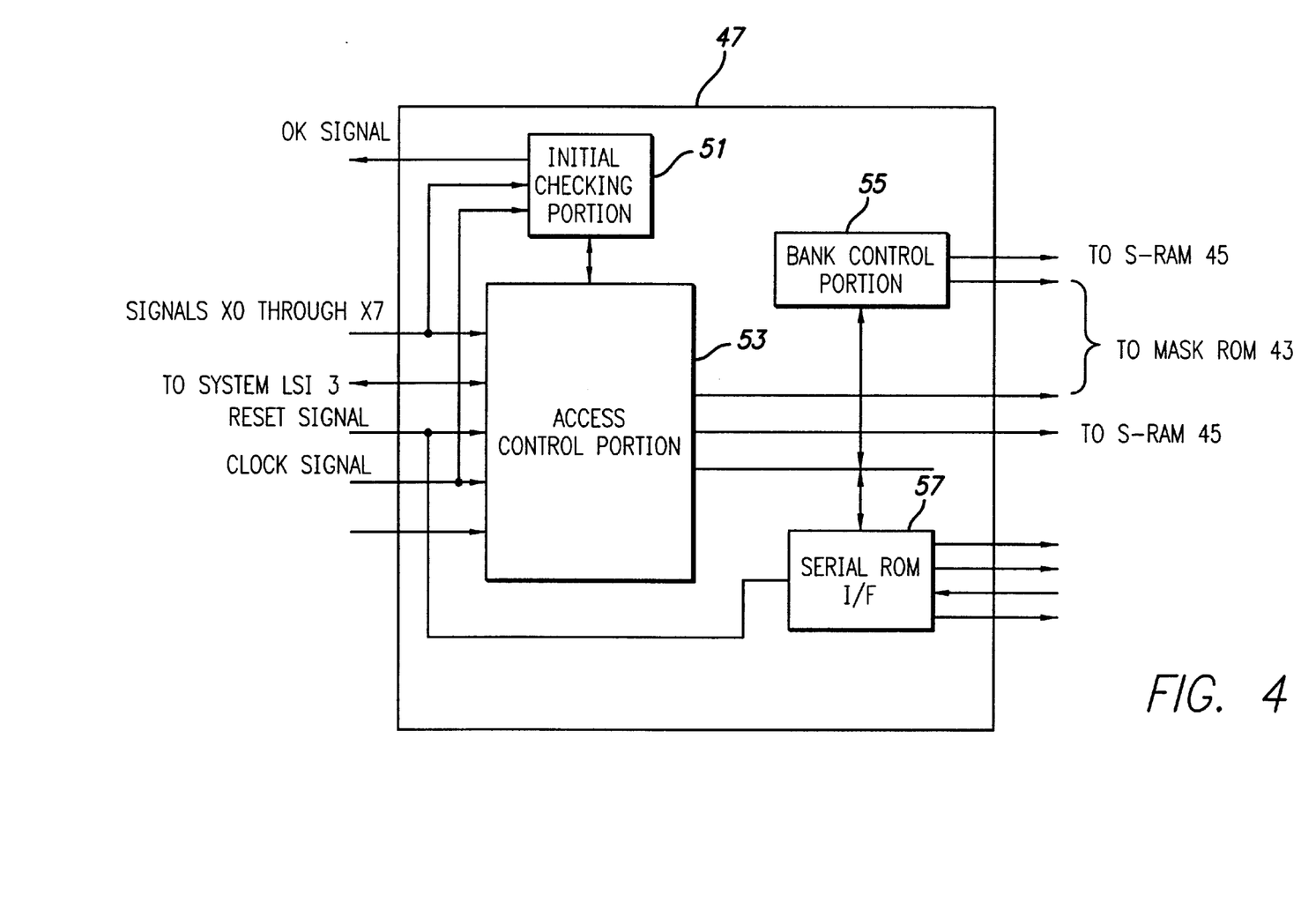
FIG. 4 is a block diagram showing in greater detail the initial controlling portion of FIG. 1.

As shown in FIG. 4, the initial controlling portion 47 has an initial checking portion 51, an access control portion 53, a bank control portion 55, and a serial ROM I/F 57. The initial checking portion 51 receives the first short-circuit detecting signal and the second short-circuit detecting signal via a plurality of terminals of the connector 6 and conducts a short-circuit detection of a circuit portion to be connected via the connector 6 based on the received first and second short-circuit detecting signals. The access control portion 53 is connected to the MASK-ROM 43 as well as the S-RAM 45 and controls access to the MASK-ROM 43 and access to the S-RAM 45 based on a control instruction from the system LSI 3. The bank control portion 55 is connected to the MASK-ROM 43 and controls switching of a bank based on a control instruction from the system LSI 3. The bank control portion 55 is also connected to the S-RAM 45. The serial ROM I/F 57 is connected to the access control portion 53.

Figure 5:
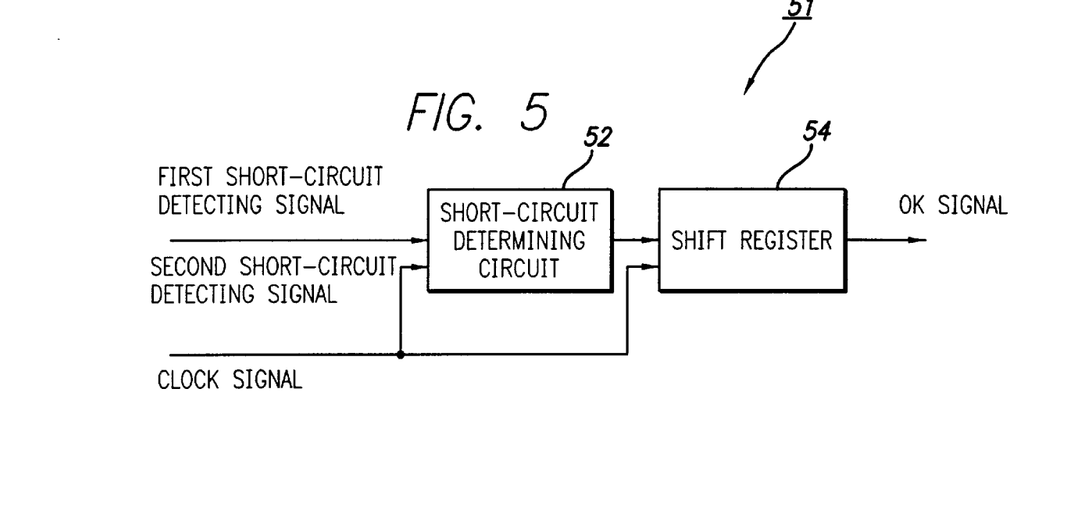
FIG. 5 is a block diagram showing in greater detail the initial checking portion of FIG. 4.

As shown in FIG. 5, the initial checking portion 51 has a short-circuit determining circuit 52 and a shift register 54. The short-circuit determining circuit 52 determines whether or not a plurality of pin terminals are short-circuited with a connecting line and a circuit portion connected to these pin terminals based upon the received first and second short-circuit detecting signals. This is accomplished by verifying that the plurality of pin terminals are not in a state of short-circuit with the connecting line and the circuit portion connected to these pin terminals when logical levels of adjacent bits of the received first short-circuit detecting signal are different from each other, logical levels of adjacent bits of the received second short-circuit detecting signal are different from each other, and each bit forming the second short-circuit detecting signal has a logical level different from a logical level of each corresponding bit of the first short-circuit detecting signal. The shift register 54 outputs an OK signal, which is hereinafter described, when the short-circuit determining circuit 52 determines that there is not a state of short-circuit.

As described above, because the electronic apparatus in accordance with a first embodiment of the present invention is arranged such that a plurality of pin terminals are not in a state of short-circuit with a circuit portion connected to these pin terminals when a logical level of adjacent bits of the first short-circuit detecting signal are different from each other, a logical level of adjacent bits of the second short-circuit detecting signal are different from each other, and each bit forming the second short-circuit detecting signal has a logical level different from a logical level of each corresponding bit of the first short-circuit detecting signal when the power source is turned on, the existence of a short-circuit can be checked easily prior to a security check and a malfunction can be prevented.

A description will now be made of an electronic apparatus in accordance with a second embodiment of the present invention. As shown in FIG. 1, the cartridge 5 has the MASK-ROM 43. The MASK-ROM 43 stores a game program. Furthermore, the shift register 54 provided inside the initial controlling portion 47 stores an OK signal consisting of a first code data for a security check, that is serial data of 18 bits shown in (E) of FIG. 9. In addition, the initial controlling portion 47 reads the first code data from the shift register 54 when the short-circuit determining circuit 52 determines that the circuit portion is not short-circuited. The initial controlling portion 47 outputs the read first code data (OK signal) to the system LSI 3 via the connector 6.

Figure 6:
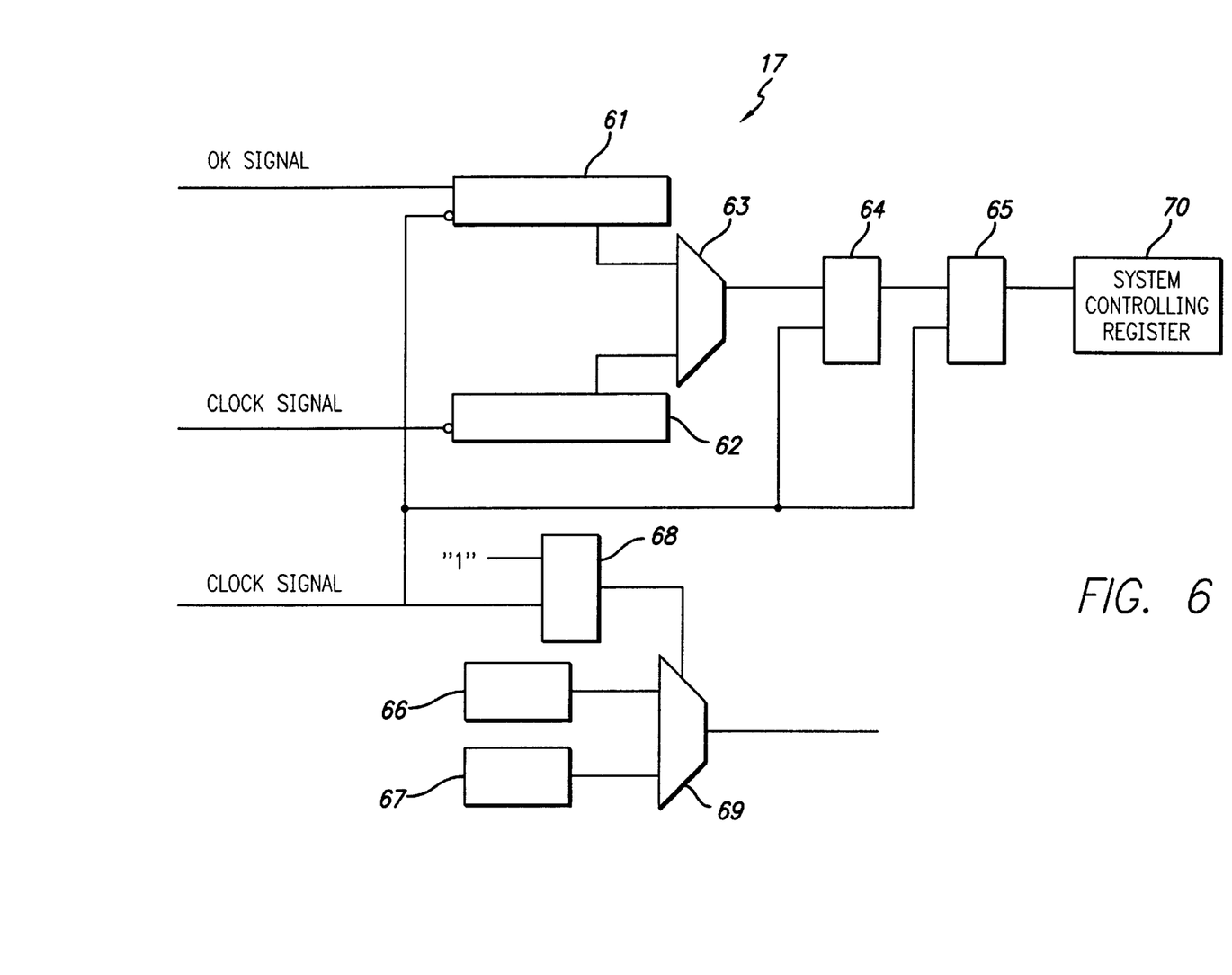
FIG. 6 is a block diagram showing a bus interface of FIG. 1.

FIG. 6 is a block diagram showing an internal composition of the bus I/F 17 shown in FIG. 1. The bus I/F 17 has a shift register 61, a shift register 62, a comparator 63, and flip-flop circuits 64 and 65. The shift register 61 inputs the first code data transmitted from the initial controlling portion 47 of the cartridge 5 as well as a clock signal and outputs the first code data in order in synchronous with the clock signal. The shift register 62 stores the second code data for a security check. The comparator 63 inputs the first code data from the shift register 61 as well as the second code data from the shift register 62 and determines whether the first and the second code data coincide. That is to say, the comparator 63 compares the first code data with the second code data and determines whether the first and the second code data are in a predetermined relationship. This comparison of the first code data and the second code data includes not only a case where the first and the second code data coincide but also a case where one code data supplements the other code data, for example, a case where a logical level of each bit forming one code data is different from a logical level of each corresponding bit of the other code data.

The flip-flop circuits 64 and 65 are given a clock signal and the flip-flop circuit 64 is given an output signal from the comparator 63, and the flip-flop circuit 65 is given an output signal from the flip-flop circuit 64. The output signal from the flip-flop circuit 65 is given to a system controlling register 70 and is recorded as a flag showing that the first code data and the second code data are in a predetermined relationship or a flag showing that they are not in a predetermined relationship.

The CPU 11 executes various kinds of control processing based on a flag recorded in the system controlling register 70. That is to say, the CPU 11 prohibits a transfer of a game program from the cartridge 5 to the electronic apparatus body 2 when the comparator 63 determines that the first code data and the second code data are not in a predetermined relationship. The CPU 11 permits a transfer of a game program from the cartridge 5 to the electronic apparatus body 2 when the comparator 63 determines that the first code data and the second code data are in a predetermined relationship. The CPU 11 also executes control processing relating to a game based on the game program transferred from the cartridge 5.

The bus interface 17 has registers 66 and 67, a timing circuit 68, and a selector 69. The first short-circuit detecting signal is stored in the register 66. The second short-circuit detecting signal is stored in the register 67. The timing circuit 68 inputs a clock signal and operates in synchronous with the clock signal. The output of the timing circuit 68 is connected with the selector 69 and gives an output timing of the first short-circuit detecting signal and an output timing of the second short-circuit detecting signal. The selector 69 is connected with the registers 66 and 67 and selectively switches the output timing of the first short-circuit detecting signal and the output timing of the second short-circuit detecting signal based on the timing from the timing circuit 68.

As described above, the electronic apparatus in accordance with a second embodiment of the present invention can prevent a malfunction and eliminate unlawful cartridges because it is so configured as to conduct a short-circuit check of a circuit portion passing through a plurality of pin terminals as well as a security check when the power source is turned on.

Figure 7:
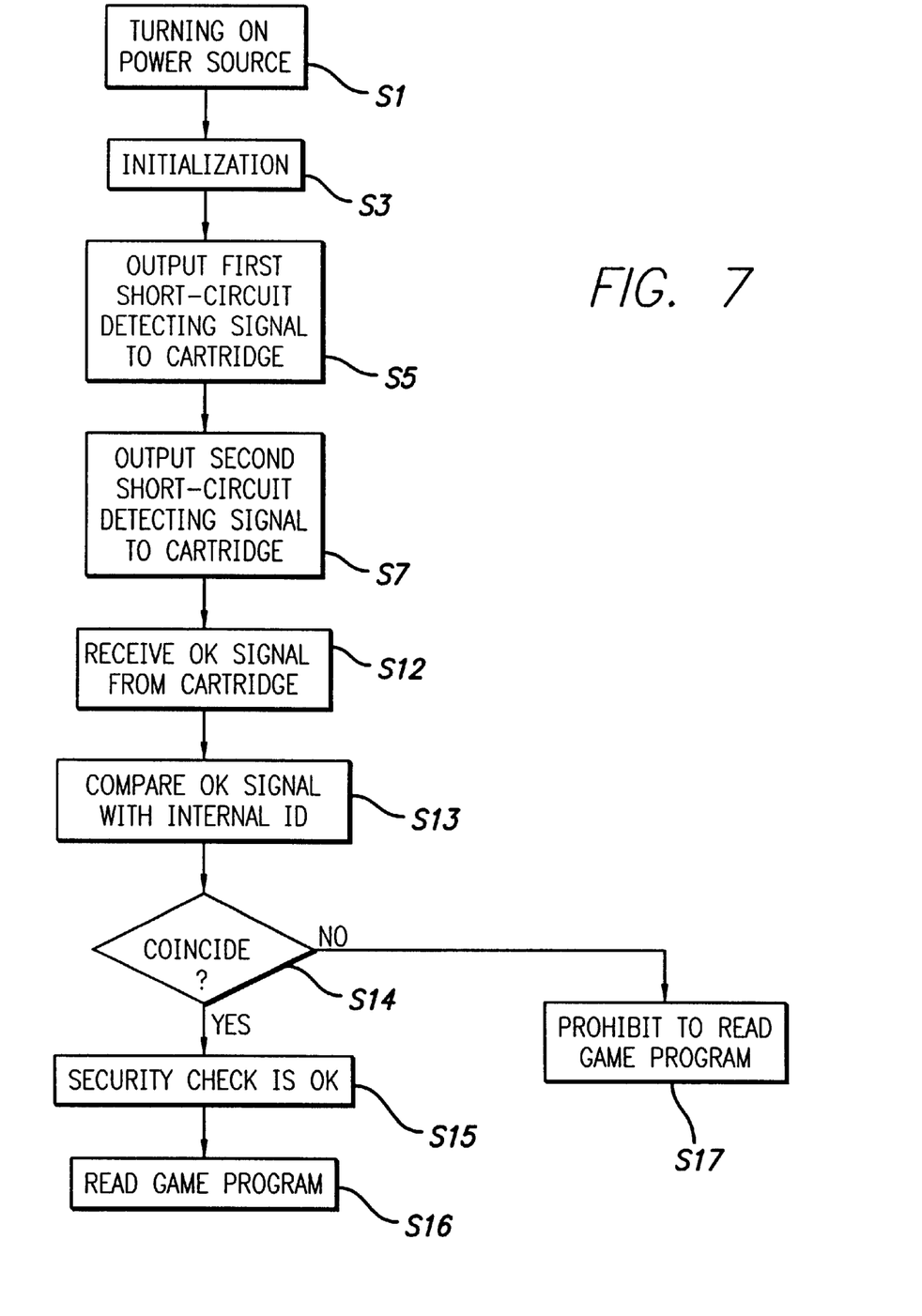
FIG. 7 is a flowchart showing control processing in a system LSI of FIG. 1 on the electronic apparatus body side.
Figure 8:
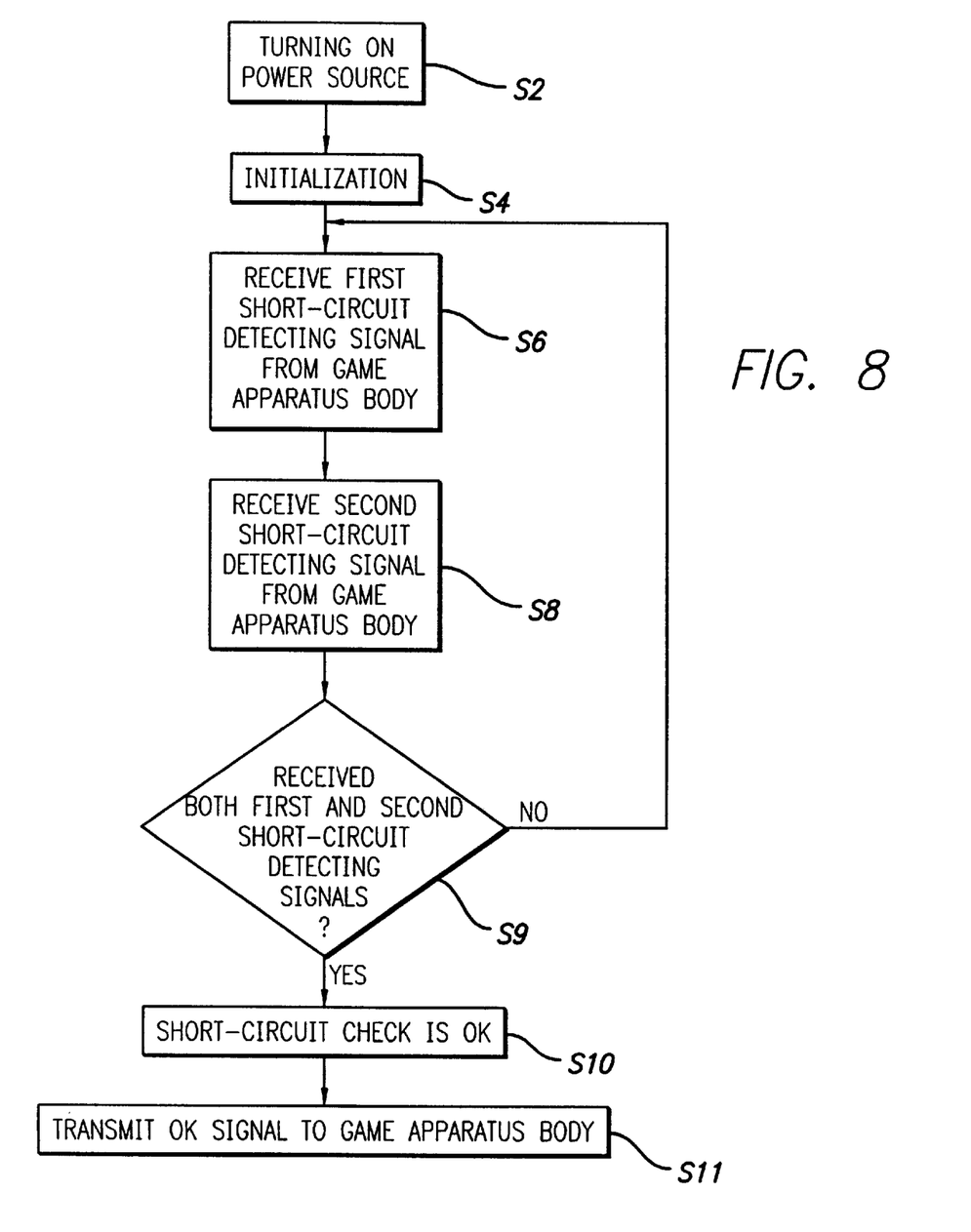
FIG. 8 is a flow chart showing control processing in the initial controlling portion of FIG. 1 on the cartridge side.
Figure 9:
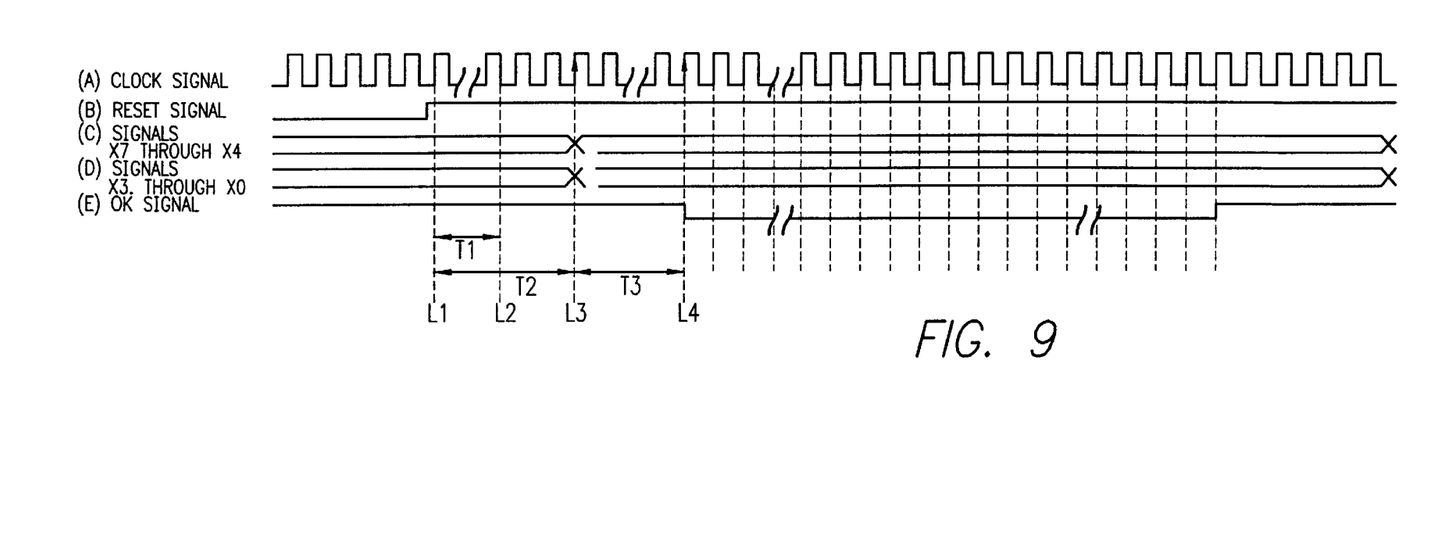
FIG. 9 is a signal waveform chart at the time of short-circuit detection.

An operation of the present invention is now described with reference to FIG. 7 through FIG. 9. FIG. 7 is a flow chart showing control processing in the system LSI 3 of the electronic apparatus body 2, FIG. 8 is a flow chart showing control processing in the initial controlling portion 47 of the cartridge 5, and FIG. 9 is a signal waveform chart.

Electrical power is supplied from the electronic apparatus body 2 to the cartridge 5 when the cartridge 5 is mounted in the electronic apparatus body 2 and the power source is turned on (by steps S1 and S2) by the operation of the key operating portion 7. When electrical power is supplied from the electronic apparatus body 2 to the cartridge 5 in this way, initialization of each circuit is executed (steps S3 and S4).

The system LSI 3 outputs the first short-circuit detecting signal shown in FIG. 3 to the cartridge 5 in step S5. That is to say, signals X7 through X4 forming a portion of the first short-circuit detecting signal are outputted until time t3 shown in (C) of FIG. 9 and signals X3 through X0 forming the remaining portion of first short-circuit detecting signal are outputted until time t3 shown in (D) of FIG. 9. The second short-circuit detecting signal shown in FIG. 3 is then outputted to the cartridge 5 in step S7. That is to say, signals X7 through X4 forming a portion of the second short-circuit signal are outputted from time t3 shown in (C) of FIG. 9 and signals X3 through X0 forming the remaining portion of second short-circuit signal are outputted from time t3 shown in (D) of FIG. 9.

The initial controlling portion 47 of the cartridge 5 receives the second short-circuit detecting signal (step S8) after receiving the first short-circuit detecting signal (step S6). Here, the initial controlling portion 47 determines that the first short-circuit detecting signal is detected for more than a predetermined period of time T1 from time t1 when a reset signal shown in (B) of FIG. 9 is transitioned from a logical level "0" to "1", and thereafter the second short-circuit detecting signal is detected after a predetermined period of time T2 (T2>T1) passes from time t1. Values for the predetermined periods of time T1 and T2 can be set at suitable values that can ensure the detection of the first short-circuit detecting signal. For example, the predetermined period of time T1 may be desirably set as longer than the time equivalent to at least three cycles of a clock signal shown in (A) of FIG. 9.

The initial controlling portion 47 subsequently determines in step S9 whether or not a plurality of pin terminals and each circuit portion connected to these pin terminals are short-circuited based on the received first and second short-circuit detecting signals. That is to say, the initial controlling portion 47 determines that the short-circuit check is OK. As discussed above, no short-circuit is detected when logical levels of adjacent bits of the received first short-circuit detecting signal are different from each other, logical levels of adjacent bits of the received second short-circuit detecting signal are different from each other, and each bit forming the second short-circuit detecting signal has a logical level different from a logical level of each corresponding bit of the first short-circuit detecting signal (step S10).

As described above, when short-circuit detection results are satisfactory, processing proceeds from step S10 to step S11 and an OK signal is outputted to the system LSI 3. That is to say, the initial controlling portion 47 outputs an OK signal of 18 bits consisting of a beginning code (1 bit), a specific code data (16 bits) and an ending code (1 bit) from time t3 until time t4 after the passing of a predetermined period of time T3, as shown in (E) of FIG. 9. The predetermined period of time T3 can be set to a suitable value that ensures the detection of the second short-circuit detecting signal. However, the OK signal can be made up of a suitable number of bits without being limited to the above mentioned number of bits and a suitable code data consisting of a combination of the logical levels "1" and "0" can be used as the above mentioned code data.

The system LSI 3 records the OK signal in the shift register 61 when the bus I/F 17 receives the OK signal transmitted from the initial controlling portion 47 in step S12. Subsequently in step S13, the comparator 63 inputs the first code data included in the OK signal from the shift register 61, inputs the second code data (internal ID) from the shift register 62, and determines whether both the first and the second code data coincide.

If both the first and the second code data are determined not to coincide as a result of the comparison of the comparator 63, processing proceeds to step S17 and because the mounted cartridge is determined to be an unlawful cartridge, a transfer of a game program from the cartridge 5 to the electronic apparatus body 2 is prohibited.

If both the first and the second code data are determined to coincide in step S13 and it is determined that a security check is OK and the mounted cartridge is a lawful cartridge (step S15), a flag of a logical level "1" is elected at a predetermined bit of the system controlling register 70. Furthermore, when it is determined that a security check is OK, an OK mark showing that the cartridge is a lawful cartridge is displayed on the LCD panel 9. A player can confirm that the cartridge is a lawful cartridge by visually recognizing the OK mark.

A transfer of the game program from the cartridge 5 to the electronic apparatus body 2 is permitted (step S16) only when a flag of a logical level "1" is set at a predetermined bit of the system controlling register 70. In this way, the game program is read out from the MASK-ROM 43 and control processing relating to a game is executed based on the game program. Thus, it is ensured that unlawful cartridges are eliminated because a transfer of the game program from the cartridge 5 to the electronic apparatus body 2 is prohibited when both the first and the second code data are determined not to coincide as described above.

The first embodiment of the present invention has the effect that existence of a short-circuit can be checked easily prior to a security check and a malfunction of the electronic apparatus can be prevented because it is arranged so that a circuit portion is determined not to be in a state of short-circuit when a logical level of adjacent bits of the first short-circuit detecting signal are different from each other, a logical level of adjacent bits of the second short-circuit detecting signal are different from each other, and each bit forming the second short-circuit detecting signal has a logical level different from a logical level of each corresponding bit of the first short-circuit detecting signal when the power source is turned on, as described in the foregoing paragraphs.

The second embodiment of the present invention has the effect that a highly reliable electronic apparatus can be realized, which can prevent a malfunction of the electronic apparatus and eliminate unlawful cartridges because it is so arranged as to conduct a short-circuit check of a circuit portion passing through a plurality of pin terminals as well as a further security check when the power source is turned on.

Thus, it is seen that an improved electronic apparatus is provided. One skilled in the art will appreciate that the present invention can be practiced by other than the preferred embodiments which are presented for purposes of illustration and not of limitation, and the present invention is limited only by the claims which follow.

What is claimed is:

1. An electronic apparatus comprising:
    an electronic apparatus body;
    a cartridge connectable to said electronic apparatus body and adapted to exchange data with said electronic apparatus body, wherein said electronic apparatus body provides a short-circuit detection signal to said cartridge, and said cartridge receives said short-circuit detection signal and determines a condition of connectability to said electronic apparatus body based on said short-circuit detection signal.

2. The electronic apparatus of claim 1, wherein said electronic apparatus further comprises a status signal provided by said cartridge, said status signal indicating said condition of connectability of said cartridge with said electronic apparatus body.

3. The electronic apparatus of claim 1, wherein said electronic apparatus further comprises:
    a first electrical connector with a plurality of terminals coupled to said cartridge; and
    a second electrical connector coupled to said electronic apparatus, said first electrical connector detachably connectable to said second electrical connector wherein data is channeled between said cartridge and said electronic apparatus body by said plurality of terminals.

4. The electronic apparatus of claim 3, wherein said short-circuit detection signal further comprises:
    a first short-circuit detection signal comprised of a plurality of bits with each said bit transmitted via each said terminal of said plurality of terminals of said first electrical connector; and
    a second short-circuit detection signal sent after said first short-circuit detection signal and comprised of a plurality of bits with each said bit transmitted via each said terminal of said first electrical connector.

5. The electronic apparatus of claim 4, wherein each bit forming said first and second short-circuit detection signal is set at such a logical level that bits passing through adjacent terminals have different logical levels, and each bit forming said second short-circuit detection signal is set at a logical level different from a logical level of each corresponding bit of said first short-circuit detection signal.

6. The electronic apparatus of claim 2, wherein said status signal includes a first code data and said electronic apparatus includes a second code data, said first code data and said second code data are compared to determine if a predetermined relationship exists.

7. The electronic apparatus of claim 6, wherein said electronic apparatus further comprises:
    a memory device housed within said cartridge and containing a game program; and
    a liquid crystal display coupled to said electronic apparatus body, wherein said electronic apparatus body is adapted to execute said game program and display a cartridge condition symbol on said liquid crystal display based upon said status signal.

8. An electronic apparatus comprising:
an electronic apparatus body;
a processor housed within said electronic apparatus body;
a cartridge connectable to said electronic apparatus body and adapted to exchange data with said electronic apparatus body;
a first memory device housed within said cartridge and containing a game program to be executed by said processor;
an electrical circuit housed within said cartridge and adapted to receive a short-circuit detection signal and determine a condition of connectability between said electronic apparatus body and said cartridge;
a second memory device housed within said electronic apparatus body and coupled to said processor, said second memory device containing a program to be executed by said processor to perform an initialization process.

9. The electronic apparatus of claim 8, wherein said initialization process further comprises the steps of:
sending a short-circuit detection signal to said cartridge;
receiving a condition status signal for said coupling from said cartridge; and
determining whether to execute said game program based on said condition status signal.

10. The electronic apparatus of claim 9, wherein said electronic apparatus further comprises a first electrical connector having a plurality of terminals and coupled to said cartridge and a second electrical connector coupled to said electronic apparatus body, said first electrical connector and said second electrical connector are adapted to be detachably connectable and to channel data between said cartridge and said electronic apparatus body.

11. The electronic apparatus of claim 10, wherein said short-circuit detection signal further comprises:
a first short-circuit detection signal comprised of a plurality of bits with each said bit transmitted via each said terminal of said first electrical connector; and
a second short-circuit detection signal sent after said first short-circuit detection signal and comprised of a plurality of bits with each said bit transmitted via each said terminal of said first electrical connector, and
each bit forming said first and second short-circuit detection signal is set at such a logical level that bits passing through adjacent terminals have different logical levels, and each bit forming said second short-circuit detection signal is set at a logical level different from a logical level of each corresponding bit of said first short-circuit detection signal.

12. The electronic apparatus of claim 9, wherein said initialization process program further comprises comparing said condition status signal to a stored code to determine if a predetermined relationship exists so as to verify that said cartridge is lawful.

13. The electronic apparatus of claim 12, further comprising a display coupled to said electronic apparatus body, wherein said condition status signal is displayed on said liquid crystal display.

14. A method of determining if a detachable cartridge is lawful and properly connected to an electronic apparatus body, said cartridge having a game program and coupled to said electronic apparatus body through a detachable connector having a plurality of terminals, said method comprising the steps of:
sending a short-circuit detection signal to said cartridge from said electronic apparatus body;
receiving a condition status signal, from said cartridge to said electronic apparatus body, that indicates the status of said coupling based on said short-circuit detection signal; and
comparing said condition status signal to a stored code to determine if a predetermined relationship exists so as to verify that no short-circuit exists and that said cartridge is lawful.

15. The method of claim 14, wherein said sending step further comprises the step of sending a first short-circuit detection signal comprised of a plurality of bits with each said bit transmitted via each said terminal of said connector; and
a second short-circuit detection signal sent after said first short-circuit detection signal and comprised of a plurality of bits with each said bit transmitted via each said terminal of said connector;
wherein each bit forming said first and second short-circuit detection signal is set at such a logical level that bits passing through adjacent terminals have different logical levels, and each bit forming said second short-circuit detection signal is set at a logical level different from a logical level of each corresponding bit of said first short-circuit detection signal.

16. The method of claim 14, further comprising the step of executing said game program if said predetermined relationship exists.

17. A cartridge for use with an electronic apparatus body having an apparatus electrical connector and an apparatus memory device connected to a processor, the apparatus memory device containing a program to be executed by said processor to perform an initialization process and generate a short-circuit detection signal, said cartridge comprising:
a cartridge memory device and a game program to be executed by said processor;
a cartridge electrical connector having a plurality of terminals; and
an electrical circuit adapted to receive said short circuit detector signal from said apparatus memory device during said initialization process.

18. The cartridge of claim 17 wherein said initialization process further comprises:
a first short-circuit detection signal comprised of a plurality of bits with each said bit transmitted via each of said plurality of terminals of said cartridge electrical connector; and
a second short-circuit detection signal sent after said first short-circuit detection signal and comprised of a plurality of bits with each said bit transmitted via each said terminal of said cartridge electrical connector.

19. An electronic apparatus comprising an electronic apparatus body and a cartridge to be detachably mounted to the electronic apparatus body, wherein:
(a) said cartridge is equipped with a connector having a plurality of terminals and is connected to the electronic apparatus body via the connector;
(b) said electronic apparatus body has a first signal outputting means for outputting a first short-circuit detecting signal for conducting a short-circuit detection of a circuit portion to be connected via said plurality of terminals;
(c) said electronic apparatus body has a second signal outputting means for outputting a second short-circuit detecting signal after outputting said first short-circuit detecting signal;

(d) said first short-circuit detecting signal consists of a plurality of bits and each bit is transmitted via each terminal of the connector;

(e) each bit forming said first short-circuit detecting signal is set at such a logical level that bits passing through adjacent terminals have different logical levels;

(f) said second short-circuit detecting signal consists of a plurality of bits and each bit is transmitted via each terminal of the connector;

(g) each bit forming said second short-circuit detecting signal is set at such a logical level that bits passing through adjacent terminals have different logical levels and is set at a logical level different from a logical level of each corresponding bit of said first short-circuit detecting signal;

(h) said cartridge has receiving means for receiving the first short-circuit detecting signal and said second short-circuit detecting signal via said plurality of terminals;

(i) said receiving means has determining means for determining whether or not the circuit portion is short-circuited based on said received first and second short-circuit detecting signals; and (j) said determining means determines that short-circuit detection results show no short-circuit when logical levels of adjacent bits of the first short-circuit detecting signal are different from each other, logical levels of adjacent bits of the second short-circuit detecting signal are different from each other, and each bit forming the second short-circuit detecting signal has a logical level different from a logical level of each corresponding bit of the first short-circuit detecting signal.

20. The electronic apparatus according to claim 19, wherein:

(a) said cartridge has program storing means for storing a game program and first code data storing means for storing first code data for security checks;

(b) said cartridge has reading means for reading said first code data from said first code data storing means when said determining means determines that short-circuit detection results show no short-circuit;

(c) said cartridge has code data outputting means for outputting said read first code data to said electronic apparatus body via said connector;

(d) said electronic apparatus body has second code data storing means for storing second code data for security checks;

(e) said electronic apparatus body has comparing and determining means for comparing said first code data and said second code data to determine whether or not the data have a predetermined relationship;

(f) said electronic apparatus body has prohibiting means for prohibiting a transfer of said game program from said cartridge to said electronic apparatus body when said comparing and determining means determines that said first code data and said second code data do not have said predetermined relationship;

(g) said electronic apparatus body has permitting means for permitting a transfer of said game program from said cartridge to said electronic apparatus body when said comparing and determining means determines that said first code data and said second code data have said predetermined relationship; and (h) said electronic apparatus body has control processing means for executing control processing for a game based on said game program transferred from said cartridge.

* * * * *